(12) United States Patent
Bangert

(10) Patent No.: US 7,225,321 B2
(45) Date of Patent: May 29, 2007

(54) REPROGRAMMABLE MICROPROGRAM BASED RECONFIGURABLE MULTI-CELL LOGIC CONCURRENTLY PROCESSING CONFIGURATION AND DATA SIGNALS

(75) Inventor: Joachim Bangert, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 150 days.

(21) Appl. No.: 10/494,052

(22) PCT Filed: Oct. 25, 2002

(86) PCT No.: PCT/DE02/04019

§ 371 (c)(1),
(2), (4) Date: Apr. 29, 2004

(87) PCT Pub. No.: WO03/038644

PCT Pub. Date: May 8, 2003

(65) Prior Publication Data

US 2004/0250052 A1    Dec. 9, 2004

(30) Foreign Application Priority Data

Oct. 29, 2001  (DE) .............................. 101 53 349

(51) Int. Cl.
  *G06F 15/76* (2006.01)
(52) U.S. Cl. .............................. 712/37; 326/38; 716/17
(58) Field of Classification Search ...................... None
  See application file for complete search history.

(56) References Cited

U.S. PATENT DOCUMENTS

| 4,870,302 | A |   | 9/1989  | Freeman ........................ 326/41 |
| 5,243,238 | A | * | 9/1993  | Kean ............................ 326/41 |
| 5,301,344 | A | * | 4/1994  | Kolchinsky .................... 712/32 |
| 5,712,578 | A |   | 1/1998  | Conley .......................... 326/39 |
| 5,794,062 | A |   | 8/1998  | Baxter .......................... 712/30 |
| 5,828,858 | A | * | 10/1998 | Athanas et al. .............. 710/317 |
| 6,047,115 | A | * | 4/2000  | Mohan et al. ................. 716/16 |
| 6,173,434 | B1 |  | 1/2001  | Wirthlin et al. ............... 716/17 |
| 6,721,884 | B1 | * | 4/2004 | De Oliveira Kastrup Pereira et al. .................. 713/2 |
| 6,765,407 | B1 | * | 7/2004 | Snyder ......................... 326/38 |
| 6,779,168 | B2 | * | 8/2004 | Hamlin ......................... 716/16 |
| 2001/0043488 | A1 | | 11/2001 | Weber et al. ................ 365/158 |

FOREIGN PATENT DOCUMENTS

| DE | 196 14991 A 1 | 10/1996 |
| EP | 0 253 530     | 1/1988 |
| EP | 0 497 029 A2  | 8/1992 |
| EP | 0 833 244 A1  | 4/1998 |
| WO | WO 00/19441   | 4/2000 |

OTHER PUBLICATIONS

IW Ranmuthu et al., "Magneto-Resistive Elements an Alternative to Floating Gate Technology", Proceeding of the Midwest Symposium on pp. 134-136 vol. 1, Aug. 9-12, 1992, Washington DC, ISBN:0-7803-0510-8, Number of pp. 2 vol. xxviii+1584, References Cited: 3 INSPEC Acession No. 4575212.

Guangming Lu et al.; "The MorphoSys Dynamically Reconfigurable System-On-Chip" Evolvable Hardware, Proceedings of the First NASA/DOD Workshop on Pasadena, 1999, pp. 1-9.

* cited by examiner

*Primary Examiner*—Kenneth S. Kim
(74) *Attorney, Agent, or Firm*—Young & Thompson

(57) ABSTRACT

A digital logic unit can be reconfigured and includes: a plurality of logic cells (19, 26) that have configurable properties; a memory (13) with a plurality of microprograms (14, 16) that contains information on the functionality of a plurality of logic cells (19, 26), at least one of the microprograms (14, 16) being reprogrammable depending on a certain application at least during the current operation of the logic unit; elements for selecting at least one microprogram (14, 16); and elements for configuring logic cells corresponding to the functionality information of the selected microprogram (14, 16) at least during the current operation of the logic unit.

29 Claims, 2 Drawing Sheets

REPROGRAMMABLE MICROPROGRAM BASED RECONFIGURABLE MULTI-CELL LOGIC CONCURRENTLY PROCESSING CONFIGURATION AND DATA SIGNALS

CROSS REFERENCE TO RELATED APPLICATIONS

This is the 35 USC 371 National Stage of International Application PCT/DE02/04019 filed on 25 Oct. 2002, which designated the United States of America.

FIELD OF THE INVENTION

The invention relates to a reconfigurable digital logic unit.

BACKGROUND OF THE INVENTION

Conventional programmable logic modules such as processors run programs which are loaded from a memory. These memories may be in the form of discrete modules (for example a hard disk, a memory chip), or may be integrated in the processor. One known example of the former is the known IBM-compatible PCs, and an example of the latter is so-called flash microprocessors. The software to be run is stored in the form of command words as a machine command in the memory. The command words are loaded, analyzed and carried out in a processing unit. The processing of a single command word initiates a large number of individual actions in the logic unit.

One critical characterizing feature of conventional programmable logic modules is that the processing unit is reprogrammed for a number of clock cycles by each new command word. The information relating to the previous command word is overwritten in the processing unit, apart from register contents. The processing unit in modern microprocessors is highly complex in design, owing to the large number of possible operations. More than 30 million transistors are required for fewer than 500 possible command words, which leads to a correspondingly high power consumption since each transistor consumes energy even when it is not being used and is in the "waiting state". It has already been proposed that the operating voltage be adapted, that is to say reduced, in order to save energy. The clock frequency can likewise be reduced, although this reduces the overall performance of the logic unit.

The complexity for the design, manufacture and testing of these transistors is immense. Once the functionality has been designed, it cannot be changed. Only one task can be processed at a specific time.

Particularly when running through program loops, only a small portion of the processor is active. Most applications contain a large number of program loops, with each loop containing only a relatively small number of commands embedded in the loop. These may be counting loops, for example in order to count the number of rinsing processes in a washing machine. Conditional loops are likewise very frequent, in which the number of repetitions is not known when the loop is entered, since the loop is left as a function of a result. If the event does not occur, the previous commands in the loop are repeated.

Known digital logic units, in particular computers with microprocessors, are based on the concept of the von-Neumann computer. The central processing unit, that is to say the computer core, comprises the major components formed by the main memory, the control unit and the processing unit (arithmetic unit). The main memory stores command words (program data) and processing data (operand words), and makes them available on request. The main memory also holds intermediate results and final results from the processing. Main memories may be formed by volatile or non-volatile memories. The control unit organizes the sequence in which command words are processed. It requests command words from the main memory, and causes the command word to be carried out in the processing unit. It analyzes command words, and causes processing data to be supplied to the processing unit. The processing unit carries out the operation on the processing data, and supplies the results to the main memory. The processing unit contains a microprogram for each operation, which releases the required transmission lines. The processing unit is set by the control unit for the respective operation, that is to say for the command to be processed. This central processing unit has associated peripherals, which may be the abovementioned external memories, input and output appliances. The described main components of the central processing unit may be physically separated, but they are generally on a common processor chip with a cache, or, for example, on an embedded ROM.

Particularly in the case of frequently recurring actions, for example when running through program loops, the known digital logic units have the disadvantage that command words are loaded and carried out which were actually available a number of processor clock cycles previously in a command register. One example of a loop such as this is a keyboard check. When no key is depressed, all the loop commands are repeated at a short interval, in which case the command words have to be reloaded on each occasion, as if they were completely new. The vast majority of the processor is not required during this waiting time, but it cannot carry out any other tasks during this time.

The utilization level of a logic unit such as this is extremely poor since less than one thousand of the available hardware is used. The majority of the chip area remains unused, but power must nevertheless be supplied continuously for operation.

The matching of processors to different circumstances has already been implemented at a low complexity level. One example of this is the switching of memory banks for a processor, which contain different programs. Memory banks which are not in use at any given time can be changed. This technique is referred to as IAP (in application programming). The improvement that is achieved by this measure is comparatively minor, since nothing to do with the processor hardware has been changed, but only the programs to be run being loaded at the same time as other processes.

Programmable logic modules (PLD) are frequently used for less complex tasks. Logic modules such as these are known, for example, from U.S. Pat. No. 4,870,302 or from the publication "Ranmuthu, I. W., et al.; Magneto-resistive elements—An Alternative to Floating Gate Technology; In: Proceedings of the Midwest Symposiums on Circuits and Systems, 1992, pages 134–136 vol. 1". The entire application program in logic modules such as these is translated to suitable commands in a specific compiler (so-called fitter). The PLD is defined with this program data only once, generally on booting up: a program is read from a program memory, and configurable areas are configured. The configurable areas have the following characteristics: they either define links between predetermined points (routing areas) or process logic input signals to form logic output signals (logic cell areas) However, if connections are required which differ from the technical PLD presets implemented by the manufacturer, two or more connection blocks must be cascaded, and this results in increases in the delay times and in throughput delays. In consequence, the actual speed at which the application program is run cannot be predicted. In many cases, adaptations are required in the program in order, for example, to make it possible to achieve a minimum speed requirement or synchronization of signals in a PLD. If characteristics other than those available are required while processing logic signals (for example a greater bit length), then they must likewise be cascaded. The linking areas in the PLD thus occupy a larger area than the logic areas. Despite the configurability of the modules, the flexibility for different tasks is thus low. Thus, in general, a different chip with a different chip architecture is chosen for practical problems, whose resources are better matched to the problem (for example bit length, throughput delay requirements).

The architecture concept of the PLDs provides for the programming information to be distributed by the fitter to a large number of identical logic cells on the PLD chip. These are linked by a large number of identical routing areas. The programming information is thus distributed over the area. The configurability of the PLDs is restricted to a small number of configurable parameters, which are permanently set on booting up. In this case, two memories are required: an external boot memory chip (discrete chip, for example an EEPROM 113 in U.S. Pat. No. 4,870,302) and internal memory cells distributed over an area (for example as shown in FIGS. 3a and 10a in U.S. Pat. No. 4,870,302 of FIG. 5 in the publication from Ranmuthu et al. After booting up, the local memory cells contain the information for the links and for the logic functions for the cells. The area and line loss efficiency of the distributed memory cells is approximately two orders of magnitude poorer than that of discrete memory chips of the same performance. However, if less performance is required by the application program than that provided by the chip, then the unused areas likewise unavoidably result in power losses. Typical utilization levels of the resources of PLDs are about 30% to 70%. Only small proportions of them are actively involved in the processing of logic information at any given time.

SUMMARY OF THE INVENTION

The invention is thus based on the problem of avoiding the disadvantages which have been mentioned and of specifying a digital logic unit in which the hardware utilization is improved.

This problem is solved by a reconfigurable digital logic unit comprising two or more logic cells with configurable characteristics, in which case data signals and configuration signals can be processed at the same time; an internal memory with two or more microprograms, containing information relating to the functionality of two or more logic cells, in which case at least one of the microprograms can be reprogrammed as a function of a specific application, at least during operation of the logic unit; means for selection of at least one microprogram; as well as means for configuration of logic cells on the basis of the functionality information of the selected microprogram, at least during operation of the logic unit. The expression "functionality" should be understood as meaning both "data processing" and "data linking".

The logic unit according to the invention can thus be varied during operation; that is to say the logic cells can be configured during operation of the logic unit, and the microprogram or microprograms can be reprogrammed during operation of the logic unit or while it is being operated. The logic unit can thus be matched to the task placed on it and to be processed at any time while the logic unit is in the operating state, since no fixed configuration and programming is predetermined by the manufacturer; and in fact the unit can effectively be configured in situ, and the characteristics can be changed and adapted in situ. The change to the programming or to the configuration can be predetermined by the programmer in software, or else this may represent an autonomous learning system. Thus, the variation capability that is always provided means that there is no need to provide all the possible commands and links on the chip and, in fact, the required links can be produced based on the particular requirement at any given time, during operation. Considerably less space is therefore required on the chip and the line loss can also be considerably reduced since the adjustment capability means that only those cells and links which are needed for the required application are configured.

In this case, the expression "during operation" should be understood as meaning that state of the logic circuit in which services are offered. In principle, a distinction is drawn between the following modes or operating states of a logic circuit: "switched off" (data is stored, but cannot be changed); "booting up" (changing to the operating state); "during operation" as a characteristic state of the logic unit according to the invention; "ceasing operation" (ending of the operating phase, preparation for the "switched off" state). A further state "not available" (for example=crashed) may be reached from the booting-up process or from the operating state and can be ended again only by ceasing operation. The special case of "hot start" comprises the transition from "ceasing operation" to "booting up". The aim is thus to ensure that the logic unit according to the invention can be reconfigured at least when it is not in the switched-off mode, the boot-up mode, the cease operation mode and the unavailable mode. In contrast, the configuration of a PLD circuit according to the prior art (see EP 0 253 530 A2) represents only a special booting-up process. The logic unit may, of course, also allow the stated parts to be reconfigured in a known manner during a starting-up mode and/or during a ceasing operation mode.

The expression "logic cell" should be understood as meaning any element which carries out a logic function. In the simplest case, it may be a single memory cell, or in a more complex case it may be a gate, a sub-network comprising two or more gates, or even a processor element. The functional principle of a logic cell corresponds to that of a subroutine, and it may contain a simple functionality (for example "output=input" or "output=constant"), or may be in the form of a sub-network with considerably more complex functionality. Generally, it will contain task elements which are characterized by frequent use (for example primitive logic functions such as gate functions or full-adders) or expedient and advantageous refinements (in particular in the form of a commercial IP).

It is particularly advantageous in this case that, in principle, the configuration process and the data processing can be carried out virtually at the same speed and at the same time. This ensures that the configuration process can always be carried out, that is to say at any time and in any operating state.

The expression "configurable characteristic" that is used should be understood as meaning all non-volatile but variable characteristics or process parameters. Examples of a logic cell include the bit length at the input/the number of variables, the physical position of the inputs, the coding of the bits (for example in series or parallel form), the logic processing of the bits, the time response, the register function, the local memory function, the bit length at the output, the physical position of the output bits or the operational readiness, although this list is not exclusive. The changes can be carried out independently of other processors in the chip, and the bit processing and linking changes are ideally carried out very quickly (in the microsecond or preferably nanosecond range) in each clock cycle.

Those logic cells with configurable characteristics which have a magnetoresistive layer system are particularly suitable. A layer system such as this can advantageously be magnetically adjusted particularly quickly, in particular in a few nanoseconds.

Instead of logic cells with magnetoresistive layers, alternative, similarly powerful technologies may also be used, for example ferroelectric RAMs (FRAM).

Each logic cell in the logic unit according to the invention may have at least one magnetoresistive layer system as well as input and output connections which are connected to connecting interconnects. The layer system may be of the GMR (giant magnetoresistive) type, of the TMR (tunnel magnetoresistive) type, or of the AMR (anisotropy magnetoresistive) type.

The magnetization direction of a magnetic layer may be used for information storage. This storage process is very fast and can be carried out repeatedly with virtually no limit. The resistance of the memory cell is either low or high, depending on the magnetization direction of the free magnetic layer relative to a reference direction. A logic cell based on this may be used as a logic gate, in which case virtually all the normal gate functions (for example NOR, XOR, AND, OR, INV etc.) can be provided by driving or interconnecting two or more cells. The important factor in this case is that the functionality can be changed between at least two of these gate functions by appropriate means. In the same way, a logic cell may be used as a memory and, in particular, the result of a logic operation can be stored. Memory cells of the TRAM (tunnel random access memory) type are particularly suitable, since these can be written to repeatedly without any limit.

According to the invention, links are provided between logic cells to form logic cell blocks in the digital logic unit, having the function of a half-adder, a full-adder or a multiplier. In addition, a logic cell may comprise a local memory which can store intermediate results or final results of a logic operation.

The digital logic unit according to the invention comprises an internal memory with two or more microprograms. This may be a memory which is addressed by command words from a main memory and contains information relating to the functionality and the linking of two or more logic cells. A command word is loaded from the main memory, is analyzed, and the logic cell arrangement required for this purpose is derived from the microprogram. A microprogram such as this is comparable to a command macro and it contains a number of basic operations which can be carried out by linking two or more logic cells. Typically basic operations are loading, analysis or selection. A microprogram may accordingly be regarded as a design plan or circuit, which contains all the required information about the logic cells. In addition, it may also contain information about any memories, registers or similar components which may be required. Furthermore, a microprogram may also contain constants, for example the number "0" may be defined as a constant. In addition, a microprogram can define information about inputs, outputs or about the linking of the inputs to variables and constants.

A large number of standard tasks can be covered by the microprograms; by way of example, a keyboard check can be defined by a microprogram, in the same way as the outputting of data to an external appliance or the inputting and reception of data from an external appliance. In the same way, any desired logic operations can be stored in the form of microprograms, for example arithmetic links such as the basic types of calculation, or else considerably more complex algorithms. Logic operations are broken down into individual components, which are each defined by a microprogram.

The invention particularly advantageously provides for at least one microprogram to be reprogrammable. The microprogram can be loaded, and can be changed as a function of a specific application. This provides particularly high flexibility for the logic unit. It is also possible to provide for a microprogram to have commands for definition of new microprograms or for changing existing microprograms.

According to one development of the idea of the invention, provision is made for a microprogram to comprise commands which are contained in firmware. Furthermore, command sequences in a microprogram can be identified by an application program, and can be stored as a new microprogram. Furthermore, the digital logic unit according to the invention may have a means for selection of at least one microprogram. The microprograms may be defined in advance, or else may be redefined in the sense of "evolvable hardware". The memory may contain a large number of command words, which each use the means to select at least one microprogram.

The at least one microprogram can be selected by means of a program pointer.

The digital logic unit according to the invention furthermore comprises a means for configuration of logic cells corresponding to the functionality information of the selected microprogram.

The logic cell links which are defined by the selected microprogram as well as the local memory cells which may possibly be required are programmed in reprogrammable hardware. The magnetoresistive logic cells are programmed by a programming routine. The programming routine stipulates the sequence in which the individual logic cells will receive a programming current. The desired logic gate functions are thus programmed. In the same way, links are produced between different logic cells.

The memories which are used for the digital logic unit according to the invention have the advantage that the memory contents are not volatile, that is to say they are retained even after the voltage has been switched off. Nevertheless, logic cells which have already been programmed can be reprogrammed at a later time, that is to say the functionality of a logic cell can be reconfigured. Program loops are thus run through in hardware, that is to say a hardware configuration which is matched exactly for this purpose is created for a specific logic operation and is matched as optimally as possible to the problem to be processed. Voltage need be supplied only to those logic cells which are actually required at that time. When a program loop that is defined by logic cells is finally left, the associated logic cells can be switched off, so that they no longer consume any power. This avoids the problem that occurs with conventional logic units, in that large parts of the hardware are continuously in a waiting state in which they draw current.

It has been found to be particularly advantageous to arrange the logic cells like a raster field. This results in a regularly arranged logic cell layer, in which each individual logic cell can be addressed in the same way as the components of a matrix, by stating the row and the column. It is also possible to provide for different types of logic cells to be distributed regularly on the raster field, for example gates that are required frequently such as NOR, XOR and AND gates may be arranged in all of the areas of the raster field, so that only relatively short distances and fewer functionality configurations need to be bridged when linking individual logic cells. Logic cell links may in principle be formed in any desired way from the raster field. Logic cell links are preferable in which logic cells to be linked are directly adjacent, or are as closely adjacent as possible. The linked logic cells may be arranged on the raster field both in the form of a line or over an area, that is to say in the form of function blocks.

The logic cells with the magnetoresistive layer system and the input and output connections are connected to connecting interconnects which run essentially horizontally and vertically and preferably cross at right angles. The interconnects may be formed from a copper material.

In a further refinement of the idea of the invention, it is possible to provide for logic cells to be arranged in different layers or levels like a grid. Three-dimensionally arranged logic cells allow a considerably wider range of linking options. A variable or constant may also be stored in a logic cell. This logic cell can then be accessed by different microprograms. For example, one of the microprograms may be arranged in a higher layer, and another microprogram may be arranged alongside the logic cell. This logic cell can thus be used by a number of microprograms.

The various layer levels in the logic cells can be connected in a known manner by means of vias which are arranged at right angles to the layer level. Three-dimensional structures such as these are known and therefore require no further explanation. Reconfigurable digital logic units are preferable which contain four to six layer levels of crossing connecting interconnects with magnetoresistive layer systems between them. The individual layers may be separated from one another by an isolation layer. In addition, further components may preferably be provided on an outer face, and can be produced using conventional silicon technology. It is also possible to provide for layers which are adjacent to one another in a surface level preferably to be arranged offset with respect to one another. This makes it possible, for example, to form a straight line connecting interconnect between the second and the fourth layer. The grid arrangement may be Cartesian, or else may be arranged in a "honeycomb", in the form of a hexagonally very dense packing, in order to form a greater number of closest neighbors.

The invention provides for the processing of logic functions to be controllable by at least one command counter. A command counter, which may also be referred to as a command token, signals which of the logic cells is active at any given time, that is to say the command token points to the logic cell that is working at that time or to the logic link that is working at that time. The command counter may be a logic signal which is set ("1") in only one logic cell, and is not set ("0") in all of the other logic cells.

According to a first embodiment variant of the invention, a single command counter is provided for the logic unit. Accordingly, only a single logic cell or a single logic cell link may be active at any given time. The other logic cells are not active during this period. Once the corresponding logic function has been processed, the command counter is "moved on", that is to say it points to the next logic cell to be processed. The one or more microprograms may be arranged one behind the other on the logic cell array, so that the individual logic cells are processed sequentially.

Alternatively, it is also possible for the logic cells and the logic cell links to be stored randomly on the logic cell array, and this arrangement is comparable to the storage of data on a hard disk.

According to a second refinement, it is possible to provide for a logic unit to have two or more command counters, which may be active at the same time. Two or more microprograms may accordingly run at the same time, that is to say parallel processing takes place. The command counter or the command token may be in the form of a logic signal which is stored in a flag register and is reset after completion of the calculation. A "1" indicates that the logic cell link is active, and the flag is reset to "0" after the calculation. Only one active logic cell arrangement or one active microprogram has the value "1", which means that the operating voltage is released for the logic cells that are linked to the active microprogram. Joint use of programmed constants and the transfer of results are possible.

Microprograms may be processed in various ways. In the case of synchronously operating logic units, the flag is checked on the next clock cycle, and the next microprogram is then activated. It is possible to provide for the processing in the case of synchronous logic units to be carried out simply under time control, that is to say each microprogram has the same amount of time for processing the programmed command words. In the case of synchronous logic units, it is also possible for the processing to be carried out in a complex form under time control, that is to say with each microprogram being linked to a predetermined time for processing the programmed command words. This time information may, for example, be contained in a variable in the microprogram.

Furthermore, in the case of asynchronously operating logic units, it is possible to provide for the logic release signal to be passed on directly. The time for processing the programmed command words is irrelevant in this case. Measures may possibly be required for synchronization of two or more microprograms which are active at the same time, in order to avoid conflicts such as simultaneous access to one memory cell.

In a development of the invention, it is possible to provide for the logic unit to comprise a table of those logic cells which are occupied and/or those which are not. It is also feasible to use an algorithm to check whether a required logic cell arrangement, for example a multiplier, already exists as a configured block in the logic cell array. In this situation, the same logic cell arrangement could be used by different microprograms. Furthermore, it is possible to provide for an algorithm to find free areas in the logic cells, in order to achieve the optimum utilization of the available logic cells. It is equally possible for the functionality of the logic cells to be checked and, if appropriate, for them to be marked in a table as logic cells that have been classified as being defective.

BRIEF DESCRIPTION OF THE DRAWINGS

Further advantages and details of the invention result from the exemplary embodiment described in the following text and from the drawings. The drawings are schematic illustrations, in which.

DETAILED DESCRIPTION OF THE INVENTION

Figure 1:
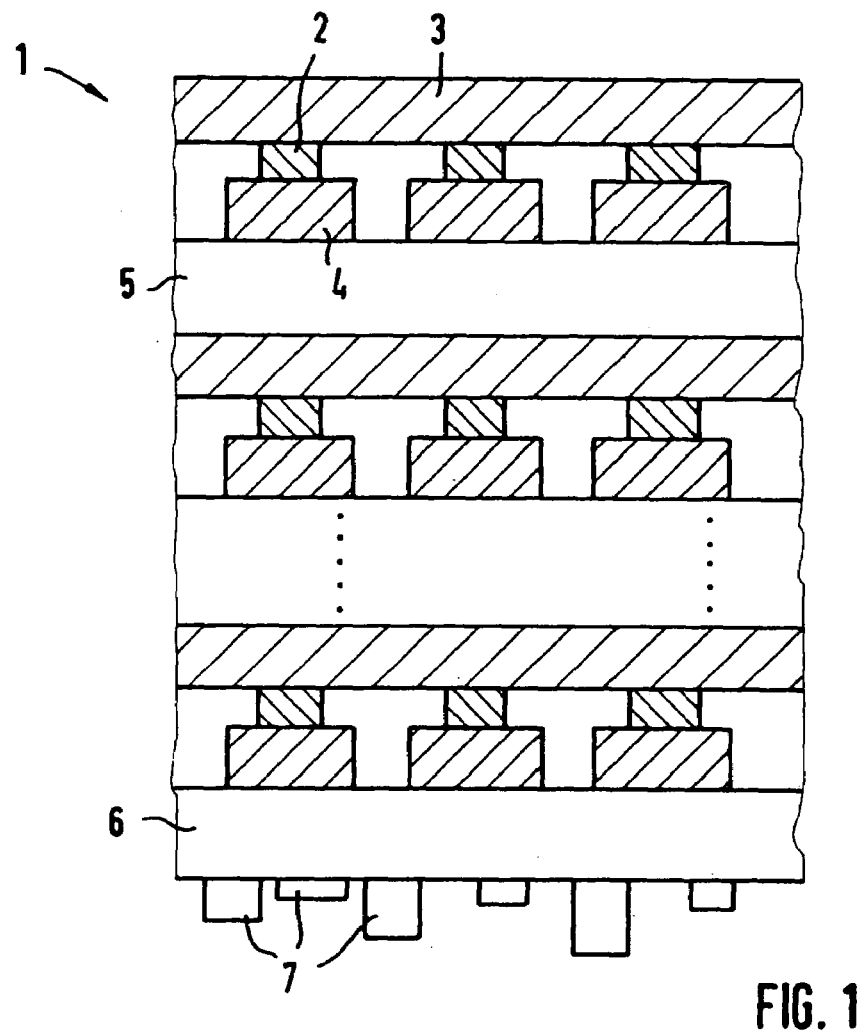
FIG. 1 shows a cross section through a logic unit according to the invention, comprising two or more layers of logic cells.

The digital logic unit 1 which is illustrated in the form of a section in FIG. 1 comprises two or more layers of magnetoresistive logic cells 2, each of which has a magnetoresistive layer system with input and output connections which are not shown in FIG. 1 but which are connected to the connecting interconnects 3, 4. The interconnects 3, 4 comprise a large number of parallel interconnects, which are arranged in different levels. The individual interconnects are electrically isolated from one another, and a connection can be made only via those logic cells 2 which are adjacent to both the interconnects 3 and 4. Each of the memory cells is separated from the adjacent layer by an isolation layer 5. The logic unit 1 may expediently comprise four to six such individual layers.

The logic cells 2 are non-volatile, but are reprogrammable, being rewritable logic components, which can be programmed at a high speed. They offer the capability to provide a logic function and a memory at the same time, or else to release or to interrupt links.

Further components 7, which are constructed using conventional silicon technology, are illustrated schematically underneath the lower isolation layer 6. It is thus possible to combine logic cells 2 with silicon semiconductors.

Figure 2:
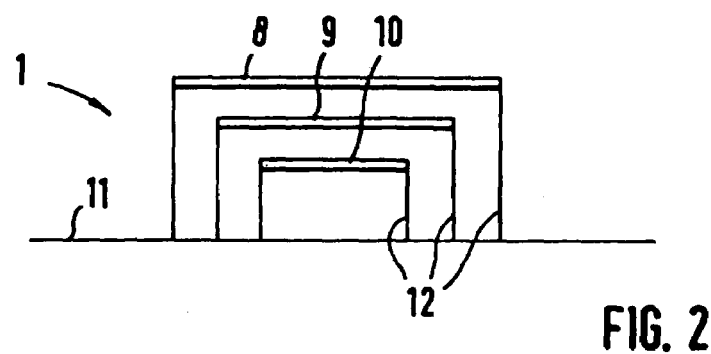
FIG. 2 shows a schematic section view of a logic unit according to the invention with vertical vias.

FIG. 2 shows a schematic section view of a logic unit according to the invention with vertical vias between the individual layers.

The logic unit 1 comprises the layers 8, 9, 10, which are formed analogously to the logic unit shown in FIG. 1. Vias 12 are formed between the layers 8, 9, 10 and a lower layer 11 and produce a vertical connection between the layers, or between logic cells which are arranged on the layers. A grid structure may also be formed in a similar manner, in which the connecting interconnects are formed along all three spatial axes, and a logic cell is located at each intersection of the grid. The X, Y and Z coordinates of a logic cell are required in order to address it.

Figure 3:
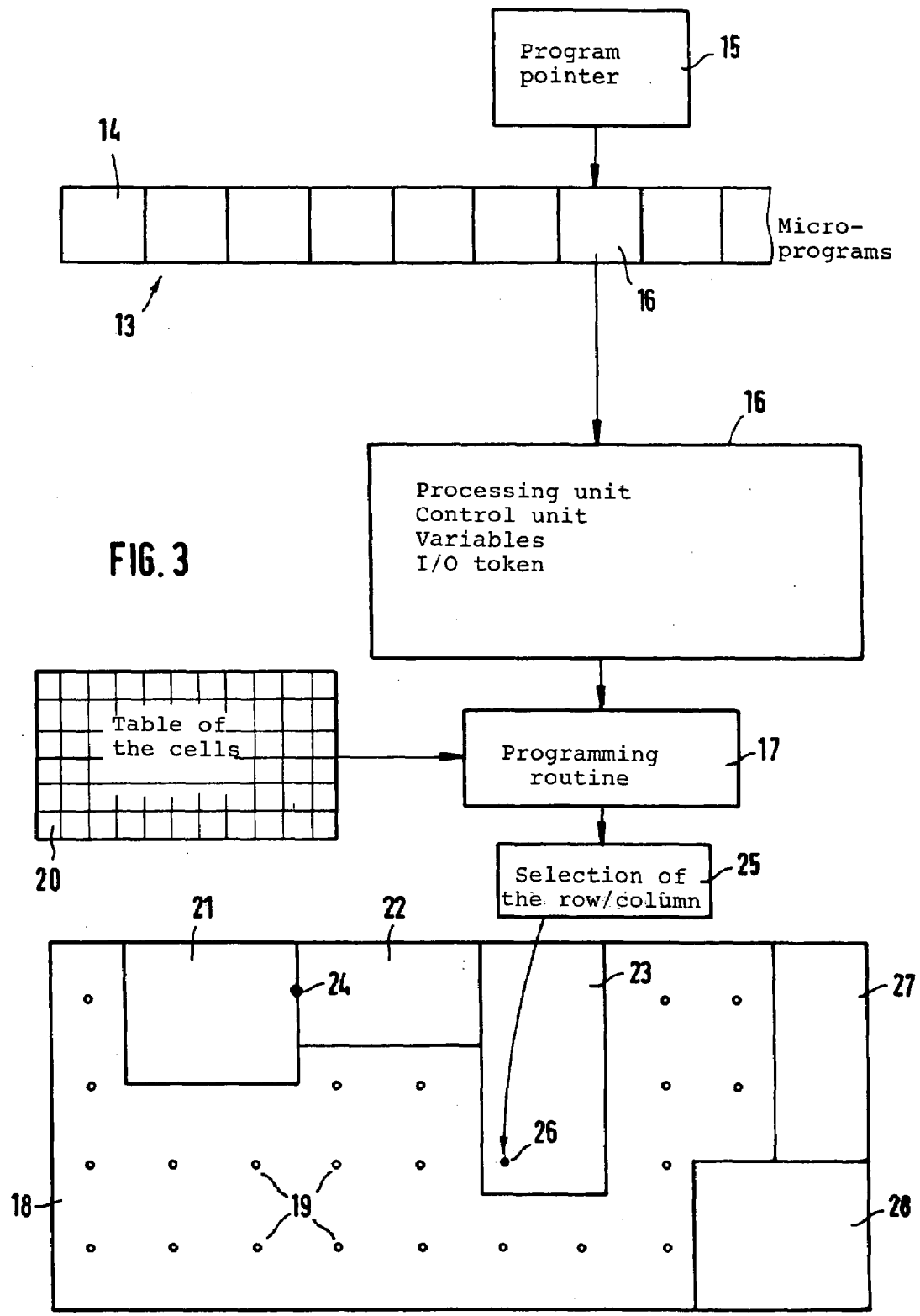
FIG. 3 shows a schematic flowchart of the configuration of a digital logic unit according to the invention.

FIG. 3 shows, schematically, the procedure for the configuration of the digital logic unit.

An internal memory 13 comprises a number of different microprograms 14, which contain information about the linking of two or more logic cells.

A program pointer 15 selects one of the microprograms in the memory 13. The selected microprogram 16 contains all the information which is required for programming the logic cells 2. This is information relating to the processing unit, to the control unit, to the variables, to the input/output processes (I/O) and a command token. There is no need for each microprogram to have information relating to all the items that have been mentioned, and, depending on the objective, individual items may be omitted, or the microprogram may contain further program information.

A programming routine 17 analyzes the information in the selected microprogram 16, and programs the required logic functions.

A logic cell array 18 comprises a large number of magnetoresistive logic cells 19 which are arranged regularly in rows and columns and are illustrated schematically by raster points in FIG. 3. The logic cell array 18 may comprise a very large number of logic cells 19, for example it could contain 1000 times 1000 cells, that is to say a total of 1 million logic cells. In this exemplary embodiment, the logic cell array 18 comprises a single layer. It is also possible to combine two or more such logic cell arrays to form a logic cell grid.

Each individual logic cell 19 can carry out a basic linking process and may, for example, be an AND or XOR gate, or may be configured appropriately.

In order to program the required logic operations and the local memory locations, the programming routine 17 selects those logic cells 19 or groups of logic cells which are not occupied, and are no longer required and can be reprogrammed. This is done using a table 20, which may also be in the form of a list and contains the free, available logic cells. Alternatively, the occupied logic cells may be recorded, and likewise those logic cells which have been found to be defective. The table 20 may also be in the form of a two-dimensional or three-dimensional matrix and may have an entry for each logic cell 19, containing information about the current status. The table 20 is updated after each programming process, newly occupied logic cells 19 are identified appropriately in the table 20, and logic cells 19 which are no longer required are released again. The information in the table 20 is used to determine the area of the logic cell array 18 in which the microprogram 16 that is to be programmed at that time is stored. The information about programmed states and links can be stored in a highly space-saving manner.

FIG. 3 does not show the main memory or its associated peripheral, which contains processing data and command words in a known manner, with the command words selecting the active microprogram from the internal memory 13.

As can be seen from FIG. 3, the logic cell array 18 already has a number of programmed logic cell blocks 21, 22, 23, each of which is associated with a specific microprogram in the memory 13. A contact point 24 is shown schematically between the logic cell blocks 21 and 22, at which signals or data can be interchanged between the logic cell blocks 21, 22. A number of such contact points may, of course, also be arranged between two adjacent logic cell blocks.

In order to program a logic cell, it must first be defined on the basis of its row and column in the selection step 25. The selected logic cell 26 is then programmed by the programming routine 17, and this procedure includes the connection of the connecting lines that are required.

The logic cell array 18 contains further logic cell blocks 27, 28, which are identified in the table 20 as no longer being required. These may be reconfigured at a later time.

Once all of the logic cells in the logic cell blocks 21, 22, 23 have been programmed, the processing of the associated logic cell links can then be started immediately. Two or more logic cell blocks may also be linked to one another in such a way that they form a ring or a loop.

A command token is required for operation of the logic cell blocks 21, 22, 23. This is a logic signal which is produced at an output of the logic cell blocks 21, 22, 23. This is intended to ensure that only one of the logic cell blocks is ever active. The command token is set for the active logic cell block, and the operating voltage is then supplied to this logic cell block. After processing of the microprogram that is associated with this logic cell block, the command token is reset, and the operating voltage is switched off. The command token is passed on to the next logic cell block, so that it can operate.

It is also possible for two or more command tokens to be set at the same time, so that two or more microprograms can be processed at the same time. This mode of operation corresponds to a distributed processor. However, it should be noted that the logic cell blocks which are associated with the respective command tokens operate completely independently of one another, that is to say it is necessary to avoid collisions occurring when access is made to memories or to address or data lines. In a corresponding manner, it is possible to provide for two or more logic cell blocks to operate synchronously. However, asynchronous operation is also possible, provided that precautions are taken to prevent the occurrence of the collisions that have been mentioned.

The invention claimed is:

1. A reconfigurable digital logic unit, based on two or more logic cells, with the ability to, during the operation of the logic unit, at the same time process data signals and configuration signals, comprising:
   two or more reconfigurable logic cells (19, 26), the logic cells configured so that the logic unit processes in the same clock cycle i) data signals and ii) configuration signals, the processing being done at the same time and during operation of the logic unit;
   a memory (13) containing two or more microprograms (14, 16), the microprograms containing information relating to the functionality of the two or more reconfigurable logic cells (19, 26);
   means for reprogramming at least one of the microprograms (14, 16) as a function of a specific application, the reprogramming being at least during operation of the logic unit;
   means for selecting at least one microprogram (14, 16) of the two of more microprograms; and
   means for configuring the logic cells on the basis of the functionality information contained within the selected microprogram (14, 16), the configuring being done at least during operation of the logic unit.

2. The logic unit as claimed in claim 1, wherein the logic cells (19, 26) have a magnetoresistive layer system.

3. The logic unit as claimed in claim 1, wherein the logic cells (19, 26) are arranged like a raster field.

4. The logic unit as claimed in claim 1, wherein the logic cells (19, 26) are connected to connecting conductor tracks (3, 4) which run essentially horizontally and vertically.

5. The logic unit as claimed in claim 4, wherein the crossing conductor tracks (3, 4) are arranged in different levels.

6. The logic unit as claimed in claim 1, wherein the logic cells (19, 26) are arranged in different layers like a grid.

7. The logic unit as claimed in claim 1, wherein the logic cells (19, 26) are arranged offset with respect to one another.

8. The logic unit as claimed in claim 1, wherein one of the a logic cell (19, 26) is associated with one of the primitive logic functions AND, XOR, OR, INV or the inverse functions NAND, XNOR, NOR, BUF, or one logic cell (19, 26) can be configured in this way.

9. The logic unit as claimed in claim 1, wherein two or more logic cells (19, 26) are linked to form a logic cell block (21, 22, 23).

10. The logic unit as claimed in claim 9, wherein the logic cell block (21, 22, 23) is in the form of a half-adder, a full-adder or a multiplier.

11. The logic unit as claimed in claim 1, wherein one of the logic cell (19, 26) has a local memory, or can be configured as a memory.

12. The logic unit as claimed in claim 1, wherein means are provided for production of commands for preferably application-oriented definition of new microprograms and/or for changing existing microprograms.

13. The logic unit as claimed in claim 1, wherein the a microprogram (14, 16) contains commands that contain firmware.

14. The logic unit as claimed in claim 1, wherein means are provided for production of an application program which is associated with a microprogram (14, 16) and identifies command sequences in the microprogram (14, 16) which can be stored as a new microprogram.

15. The logic unit as claimed in claim 1, wherein the microprogram (14, 16) contains commands for configuration of logic functions and/or links and/or variables and/or constants.

16. The logic unit as claimed in claim 1, wherein the microprogram (14, 16) interacts with a memory, in particular a volatile or non-volatile or permanent memory.

17. The logic unit as claimed in claim 9, wherein the microprogram (14, 16) can be copied to a logic cell block (21, 22, 23).

18. The logic unit as claimed in claim 9, wherein the microprogram (14, 16) has means for configuration of connections between the reconfigurable logic cells (19, 26) and/or the logic cell blocks (21, 22, 23) and/or logic cells which cannot be configured.

19. The logic unit as claimed in claim 1, wherein the processing of logic functions can be controlled by at least one command counter.

20. The logic unit as claimed in claim 19, wherein the operating voltage is released for the logic cell (19, 26) which is currently associated with the command counter, and/or for a logic cell block (21, 22, 23) which is currently associated with the command counter, or for a part of this logic cell block (21, 22, 23).

21. The logic unit as claimed in claim 19, wherein the logic unit has two or more command counters.

22. The logic unit as claimed in claim 19, wherein the logic unit is designed for synchronous processing of two or more logic functions by means of the command counter or counters.

23. The logic unit as claimed in claim 22, wherein the microprograms (14, 16) are designed such that logic functions are processed in a predetermined time period.

24. The logic unit as claimed in claim 22, wherein a microprogram (14, 16) is designed such that it has information relating to the time for processing logic functions.

25. The logic unit as claimed in claim 22, wherein the logic unit is designed for asynchronous processing of logic functions.

26. The logic unit as claimed in claim 1, wherein the logic unit has a table (20) relating to the occupancy of the logic cell field by microprograms.

27. The logic unit as claimed in claim 26, wherein the table (20) contains information relating to defective logic cells.

28. A reconfigurable digital logic unit, comprising:
   a first set of parallel interconnects (3) arranged on a first level, individual interconnects of the first set of interconnects being electrically isolated from each other;
   a second set of parallel interconnects (4) arranged on a second level, individual interconnects of the second set of interconnects being electrically isolated from each other;
   two non-volatile, reprogrammable single memory logic cells (2) arranged on a third level intermediate the first and second levels, each logic cell connected to one individual interconnect of each of the first and second sets of interconnects (3, 4), each logic cell configured to perform, at the same time, a logic function and a memory;

an internal memory (13) containing plural different microprograms (14, 16), each microprogram containing all functionality information relating to functionality of the two logic cells necessary for reprogramming the two logic cells;

a program pointer (15) configured to select one of the microprograms (16) containing all the functionality information required for the reprogramming the two logic cells to perform required logic functions;

a program routine (17) connecting to obtain the contained functionality information from the selected microprogram and analyze the contained functionality information in the selected microprogram and then to reprogram, during a single clock cycle operation of the logic unit, the two logic cells to perform the required logic functions, wherein, the functionality information contained in the selected one microprogram comprises i) data processing information and ii) data linking information to link the two logic cells, the logic cells are arranged to be configured during operation of the logic unit by the program routine so as to connect individual ones of the first and second sets of interconnects via the programming of each of the two logic cells, the microprograms are configured to be reprogrammed as a function of a specific application, at least during operation of the logic unit, and the two logic cells are configured so that the logic unit processes in the single clock cycle i) a data signal and ii) a configuration signal.

29. The unit of claim 28, wherein, the data processing information and the data linking information contained by the selected one microprogram includes information relating to a processing unit, to a control unit, to variables, to input/output processes, and to a command token.

* * * * *